US008086967B2

(12) United States Patent
Windl

(10) Patent No.: US 8,086,967 B2
(45) Date of Patent: Dec. 27, 2011

(54) MULTI-MONITOR SUPPORT FOR MDI APPLICATIONS

(75) Inventor: Helmut Windl, Peisig (DE)

(73) Assignee: Siemens Aktiengesellschaft, Munich (DE)

(*) Notice: Subject to any disclaimer, the term of this patent is extended or adjusted under 35 U.S.C. 154(b) by 1715 days.

(21) Appl. No.: 11/136,629

(22) Filed: May 24, 2005

(65) Prior Publication Data

US 2005/0262474 A1 Nov. 24, 2005

(30) Foreign Application Priority Data

May 24, 2004 (EP) .................................... 04012248

(51) Int. Cl.
*G06F 3/048* (2006.01)
(52) U.S. Cl. .................... 715/804; 715/788; 715/803
(58) Field of Classification Search .......... 715/788–804; 345/1.1–1.3
See application file for complete search history.

(56) References Cited

U.S. PATENT DOCUMENTS

| | | | | |
|---|---|---|---|---|
| 5,463,726 A * | 10/1995 | Price | ............................. | 715/797 |
| 5,835,090 A | 11/1998 | Clark et al. | | |
| 5,923,307 A * | 7/1999 | Hogle, IV | .......................... | 345/4 |
| 6,018,340 A * | 1/2000 | Butler et al. | .................. | 715/764 |
| 6,115,039 A | 9/2000 | Karren et al. | | |
| 6,181,338 B1 * | 1/2001 | Brodhun | ......................... | 715/798 |
| 6,501,441 B1 * | 12/2002 | Ludtke et al. | ................... | 345/1.1 |
| 6,573,913 B1 | 6/2003 | Butler et al. | | |
| 6,717,556 B2 * | 4/2004 | Asahi et al. | ..................... | 345/1.1 |
| 7,171,622 B2 * | 1/2007 | Bhogal | .......................... | 715/730 |
| 7,176,943 B2 * | 2/2007 | Meyers et al. | ................. | 345/619 |
| 7,237,202 B2 * | 6/2007 | Gage | ............................. | 715/761 |
| 2003/0169304 A1 | 9/2003 | Pagan | | |
| 2004/0012538 A1 | 1/2004 | Bhogal | | |

OTHER PUBLICATIONS

ATI Technologies, Inc. "Hydravision User's Guide", Online, 2002, pp. 1-51, XP002314608, Internet: URL: http://static.tigerdirect.com/pdf/ATI_Hydravision_UJser_Guide.pdf, Retrieved on Jan. 24, 2005.
David Campbell, "How to Exploit Multiple Monitor Support in Memphis and Windows NT 5.0", Microsoft System Journal, Online, Jun. 1997, pp. 1-17, XP002315609, Internet URL: http://www.microsoft.com/msj/0697/monitor/monitor.aspx, Retrieved from Internet on Jan. 24, 2005.
Claudia Schmid and Hans Hinterberger, "Comparative Multivariate Visualization Across Conceptually Different Graphic Displays", Scientific and Statistical Database Management, 1995, Proceedings, Seventh International Working Conference on Charlottesville, VA, USA, Sep. 28-30, 1994, Los Alamitos, CA, USA, IEEE Comput. Soc., Sep. 28, 1994, pp. 42-51, XP 10100544.

* cited by examiner

*Primary Examiner* — Weilun Lo
*Assistant Examiner* — Eric Wiener

(57) ABSTRACT

System and a method by means of which different windows of an Multi Document Interface (MDI) application can be displayed at the same time within an application on several screens. In addition, instances of the source frame of the MDI application are displayed on further screens and the windows of the application with the corresponding documents can then be displayed in the sequence frame instances of the MDI application. In this way, the display of the parallel side-by-side arrangement of several windows on several screens is possible, the resolution of the window being adapted to the screen resolution.

15 Claims, 2 Drawing Sheets

MULTI-MONITOR SUPPORT FOR MDI APPLICATIONS

CROSS REFERENCE TO RELATED APPLICATIONS

This application claims priority to the European application No. 04012248.3, filed May 24, 2004 and which is incorporated by reference herein in its entirety.

FIELD OF INVENTION

The invention relates to a system and a method for opening and/or processing several documents and/or files of a software application.

SUMMARY OF THE INVENTION

Modern operating systems such as MS Windows support the operation of several screens with different screen resolutions on a personal computer, in order to increase the effective operating surface for the user. In this way, several documents can be simultaneously displayed on the different screens without the need for additional operating steps. For example it is possible to write an e-mail in MS Outlook using information from a Word document without having to move between the two windows in order to view the Word document. The possibility of displaying the information on different screens exists if the contents and information are available in separate applications. The different applications can then be displayed on different screens.

In MDI applications (Multi Document Interface), which display their information and contents in several windows (Child Windows) within an application, the visualization of this window on separate screens is only possible in a restricted fashion. If a user wishes to use two screens at the same time, the only possibility of implementing these is to widen the application window of the MDI application such that it extends across both screens. The open window (Child Window) can now be freely arranged on this enlarged surface. The disadvantage of this method is that where the two screens have a different resolution, only a section of the application is visible on the screen with the lower resolution. A simple and efficient display of the information of the different windows on several screens is thus not possible with MDI applications.

A method and a system are known from the publication US 2003/0169304 A1, with the aid of which several opened documents of an MDI application can be processed via a pull-down menu of an active window of the MDI application. However, with this method the open windows of the MDI application are arranged on one screen.

The object underlying the invention is thus to enable different opened windows of an MDI application to be displayed on several screens independently from one another.

The object is achieved by means of a system for opening and/or processing several documents and/or files of at least one software application, whereby several windows for the simultaneous display of each opened document and/or opened file are provided on a screen within a source frame of the at least one software application, characterized in that the system comprises a selection device for selecting at least one further useful screen, a provision device for providing sequence frames of the at least one software application on the selected further screens and display means for displaying at least one window displaying an opened document and/or file in which the provided sequence frame/s of the software application are displayed on a selected further screen.

The object is further achieved by means of a corresponding method for opening and/or processing several documents and/or files of at least one software application.

The concept behind the invention is that, even in the environment of MDI applications, in which several documents are generally opened and processed by the user at the same time, it is hugely advantageous if the individual documents which are displayed in each instance in their own window can be distributed onto different screens. This gives the user an improved overview of the information available and the displayed information can be better used by the user. It is important here that the windows can be controlled by a user and that the predetermined screen resolution of the different screens and the corresponding color depths can be optimally used. The window with the corresponding information is thus then displayed at the optimum size, irrespective of the screen resolution.

By means of the system according to the invention, the user is then easily able to display the source frame of his/her MDI application on several screens in the form of sequence frames. Within the framework of the invention, an MS Windows functionality is exploited which enables the source frame of a software application to be replicated. The corresponding functionality is incorporated into the system according to the invention, so that it is available for the MDI application. Documents and/or windows of the application can then be moved into the corresponding sequence frames. On the corresponding screen for the user, the individual documents can be processed in each instance in their windows after activation within the framework. At the same time, the user can arrange all documents and/or windows such that the information can be displayed simultaneously without overlapping. In this way, several windows can also be moved in a sequence frame.

A further advantageous development of the invention is characterized in that the selection device and/or the provision device and/or the display means are implemented in the operating system. In this case it is particularly advantageous that the capability of displaying instances of a number of sequence frames on further screens, does not necessarily have to be a capability of the MDI application itself. The possibility of the instantiation of further sequence frames and/or the replication of the source frame is thus already provided by the operating system and/or the operating system on the corresponding computer. The MDI application running on the computer in this instance requires no additional means to enable a selection and provision of a corresponding sequence frame.

A further advantageous development of the invention is characterized in that the selection device and/or the provision device and/or the display means are implemented in the software application. In the case that the application and/or the MDI application is installed on a computer, the operating system of which comprises the condition for the selection and provision of sequence frames, it is advantageous if this possibility of instantiating sequence frames is implemented in the MDI application itself. This allows the simultaneous display of windows on several screens irrespective of operating systems of the computer forming a relevant basis thereof.

A further advantageous embodiment of the invention is characterized in that, the display means are configured such that the window is displayed on the selected further screens by dragging into the provided sequence frame/s of the software application. In this way, the operator is given a simple operating possibility on the surface. By means of a drag & drop the user is easily able to drag activated windows into an already opened sequence frame, using a mouse for example.

An operation via special function keys and special commands is thus unnecessary here. A simple to and fro movement to the surface available and a simple arrangement of the window is thus enabled.

A further advantageous embodiment of the invention is characterized in that the display means are configured such that the window is displayed on the selected further screens by means of a selection provided in the source frame of the software application. This can be realized for example in the form of a pull-down menu in the toolbar and/or the operating element of the source frame. If the user clicks on a corresponding symbol, he/she is shown the sequence frames already implemented on the different screens. For each window, which represents an opened document of the MDI application, it is possible to select onto which screen the corresponding window is to be displayed. By way of example, this can be implemented in a pull-down menu such that an allocation of the window to different screens takes place by means of an arrow key with the corresponding screen numbering.

A further advantageous embodiment of the invention is characterized in that the system is configured such that the window displayed last on a selected further screen is active. It is thus advantageous that the document and/or the file which was last assigned a screen by the user is also similarly active. It is of no importance here whether the window was assigned to the screen by dragging it onto the new screen, or by the selection via the toolbar. In this way, the user always has an overview as to which of his/her windows is active.

A further advantageous embodiment of the invention is characterized in that the system for displaying operating elements of the active window is provided in the sequence frame of the software application provided. Thus only the active window can also be processed by the user, said user immediately noticing which window is active even if he has not been using the screens concerned for some time. Only the active window has a corresponding toolbar, which enables the operation by means of mouse actions.

A further advantageous embodiment of the invention is characterized in that the system is configured such that it enables an independent positioning and/or resizing and/or closure of the provided sequence frame. In this way, the user is able to display the window including the sequence frame on difference screens in different sizes. This gives the systems the greatest possible independence from both the screen resolution and also further external boundary conditions. The information of the individual windows can thus be adapted such that an optimum information display is guaranteed at all times.

A further advantageous embodiment of the invention is characterized in that there is provision, if the sequence frame provided for containing the window of the further screen is closed, to display a window in the source frame. If the sequence frame and/or the corresponding instance and/or replication of the source frame provided is closed again by the user, the information and/or the opened document displayed in the sequence frame is also not automatically closed. In fact, the corresponding window is displayed again in the source frame, thus the frame on the computer on which the application was started, and from which the sequence frames were designed. It is advantageous here that available information does not simply get lost and that opened documents correspondingly also remain opened.

A further advantageous embodiment of the invention is characterized in that, when the last frame of the software application is closed, there is provision for the termination of the software application. This advantageously guarantees that the entire MDI application will be closed correctly.

The invention is described in more detail below with reference to the exemplary embodiments displayed in the figures.

DETAILED DESCRIPTION OF THE INVENTION

Figure 1:
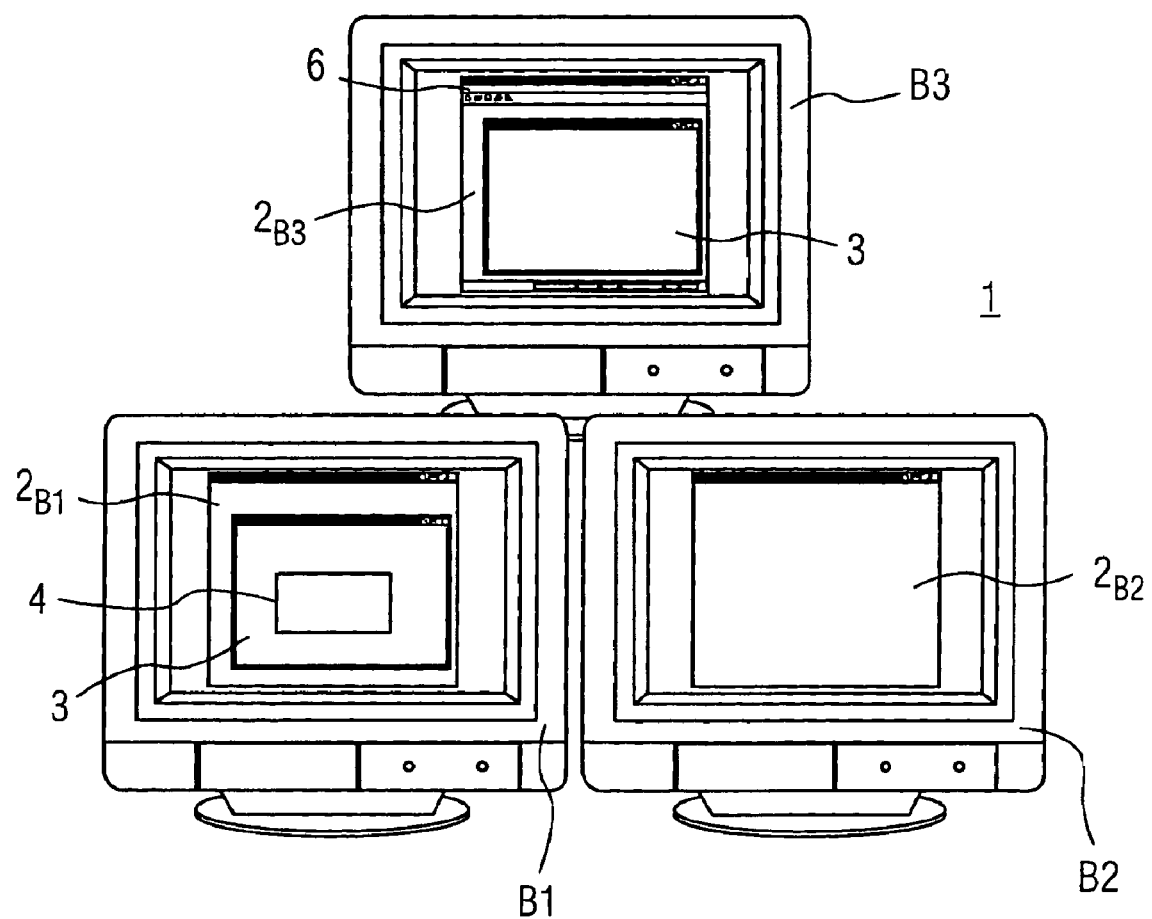
FIG. 1 shows a schematic representation of the system with several screens.

FIG. 1 displays the system 1 for opening and processing several documents 4. The documents 4 are opened in each instance in a window 3 of the application. A first screen B1 exists in the system 1, on which the MDI application runs in a source frame $2_{B1}$. In the system 1, further screens B2, B3 exist. Sequence frames $2_{B2}$, $2_{B3}$ of the source frame $2_{B1}$ of the MDI application are shown in each instance on the further screens B2, B3. The sequence frames $2_{B2}$, $2_{B3}$ are displayed on all selected screens B2, B3. Further windows 3 of the MDI application are displayed in the sequence frame $2_{B2}$, $2_{B3}$ in order to show documents or files 4.

The sequence frame $2_{B3}$ of the screen B3 is active in FIG. 1. In this frame, the toolbar is designed in the form of an operating bar with operating elements 6. Based on the source frames $2_{B1}$ of the MDI application, a user of the system 1 can select further screens B2, B3 and can display corresponding sequence frames $2_{B2}$, $2_{B3}$ on these screens. In the sequence frames $2_{B2}$, $2_{B3}$ information in the documents 4 can be displayed either by dragging with the aid of the mouse of by selecting a further window 3. The information displayed in the documents 4 can be displayed on several screens, simultaneously within one application.

The size and/or resolution of the screens B1, B2, B3 are thus optimally utilized. The opened windows 3 with the documents 4 are therefore opened within an MDI application. The active window 3 is accessible to the user for processing purposes, since the operating elements 6 are displayed in the corresponding sequence frame $2_{B3}$. In the other sequence frames which currently do not contain any active window, the corresponding operating elements 6 are hidden. If a window 3 is moved into a frame 2, it is also activated. The frame in which the active window 3 is contained, stands out in that menus, toolbars and status bars are displayed.

On the one hand, the information needed for the work in frame 2 is available using the active window 3 and is easily accessible. On the other hand, the frame with the active window can be easily recognized. The frame supports the capabilities such as the screen resolution or the color depth of the screen on which it is displayed. This ensures the best possible display of the contents. The individual frames 2 can be positioned independently from one another, resized or closed. If a frame is closed, the windows (Child Windows) displayed therein are displayed again in the source frame $2_{B1}$ of the main application. When the last frame 2 is closed, the application is also terminated.

Figure 2:
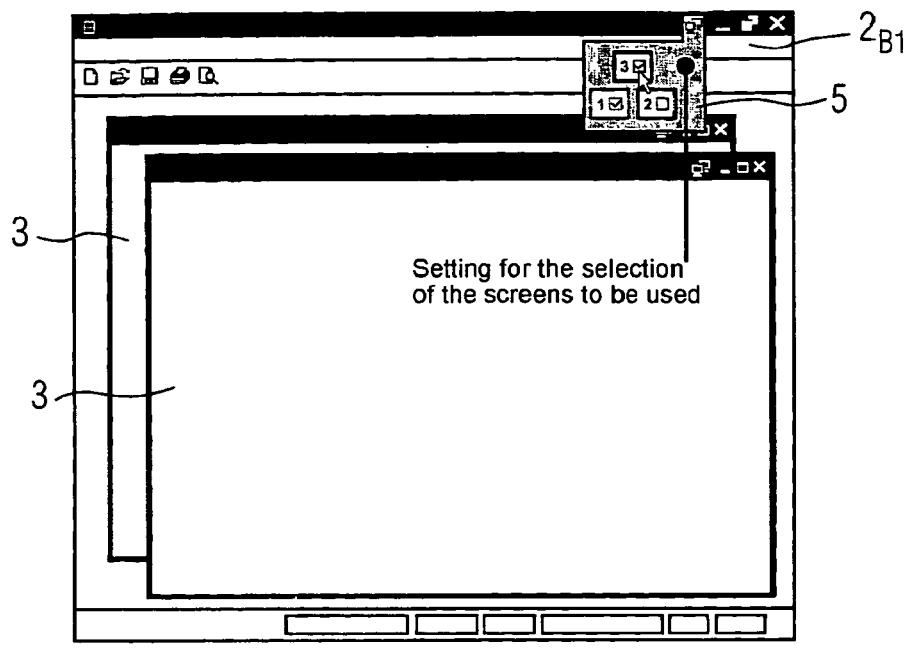
FIG. 2 shows a source frame with a selection device.

FIG. 2 shows a source frame $2_{B1}$. Two windows 3 (Child Windows) are opened in the source frame $2_{B1}$, said windows displaying data and/or information. A selection device 5 is shown in the toolbar in the source frame $2_{B1}$. The selection device 5 can be designed in the form of a pull-down menu. The user of the system 1 is then shown further screens B2, B3 by scrolling through the pull-down menu, said screens being available for use by means of MDI application. By clicking or setting a checkmark, the user is able to add further screens for example from the selection device 5. If the further screens B2, B3 have been selected by means of the selection device 5, sequence frames $2_{B2}$, $2_{B3}$ can be viewed on the screens and documents displayed in the corresponding windows 4.

Figure 3:
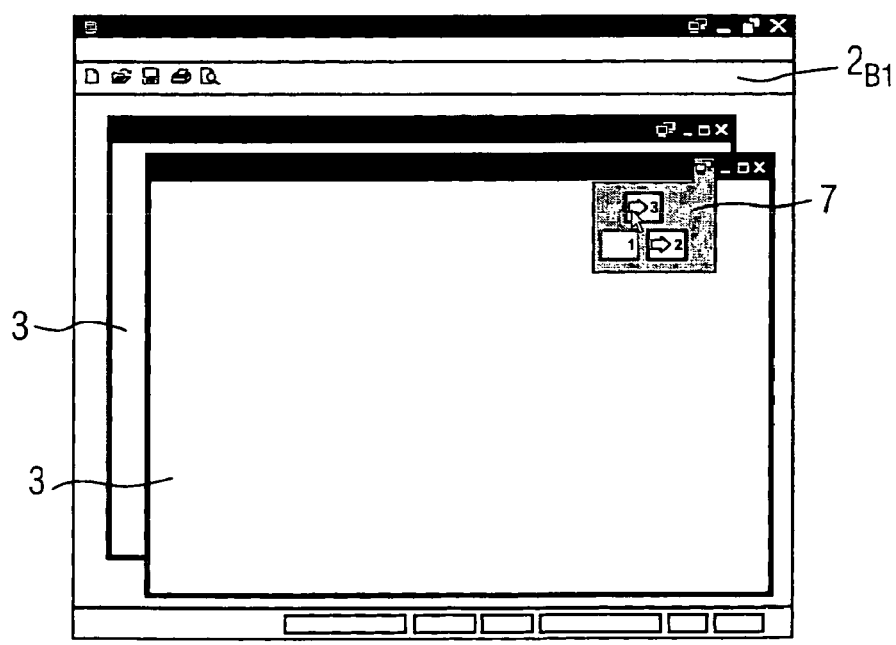
FIG. 3 shows a source frame with opened windows and display means for the window.

FIG. 3 shows a source frame $2_{B1}$ with two opened windows 3 for displaying information. A display means 7 configured as a pull-down menu is displayed in one of the windows 3. The user of the system is shown here the already selected screens B2, B3. By clicking on one of the screens B2, B3 available in the relevant window 3, the window 3 is moved together with the information located therein, onto the corresponding screen B2, B3 and inspected there. Alternatively, the windows on the newly selected screens B2, B3 can also be brought for inspection by means of dragging the mouse.

In summary, the invention relates to a system and method with which different windows of an MDI application within an application can be displayed simultaneously on several screens. In addition, instances of the source frame of the MDI application are displayed on further screens and the windows of the application with the corresponding documents can be subsequently displayed in the sequence frame instances of the MDI application. In this way, the parallel display of several windows arranged side by side is possible on several screens, whereby the resolution of the window is adapted to the screen resolution.

The invention claimed is:

1. A system for opening, and/or processing several documents, and/or files of a software application, the system comprising:
    a first screen for displaying a source frame of the software application, wherein the source frame provides a plurality of windows for simultaneously displaying a plurality of opened documents or a plurality of opened files;
    a selection device for selecting a further screen;
    a provision device for providing a sequence frame of the software application on the further screen; and
    a display mechanism for displaying at least one window including an opened document or opened file in the sequence frame, wherein at least one of the selection device, the provision device and the display mechanism is implemented by the software application and the system is configured to enable a positioning or resizing of the sequence frame independent of the source frame.

2. The system according to claim 1, wherein the display mechanism is configured such that the display of the windows on the further screen is effected by dragging into the sequence frame.

3. The system according to claim 1, wherein the display mechanism is configured such that the windows on the further screen are displayed by a selection provided in the source frame of the software application.

4. The system according to claim 1, wherein the system is configured such that the window displayed last on the further screen is active.

5. The system according to claim 1, wherein the system is adapted for displaying operating elements of an active window in the sequence frame of the software application.

6. The system according to claim 1, wherein the system is configured to display a window in the source frame in the case of a closure of the sequence frame containing the window.

7. A method for opening, or processing several documents or files of at least one software application, comprising:
    a) providing a screen displaying a source frame of the at least one software application, wherein in the source frame an opened document or an opened file are displayed at the same time in a window in each instance;
    b) selecting at least one further screen;
    c) providing at least one sequence frame of the at least one software application on the at least one further screen;
    d) displaying at least one window displaying an open document or file on the at least one provided sequence frame of the software application;
    e) allowing positioning or resizing of the sequence frame independent of the source frame; and
    f) displaying a window displaying the open document or file in the source frame when the sequence frame is closed.

8. The method according to claim 7, wherein the software application is terminated when the last frame of the software application is closed.

9. The method according to claim 7, wherein the method steps b), c), and d) are performed by an operating system running the software application.

10. The method according to claim 7, wherein the method steps b), c), and d) are performed by the software application.

11. The method according to claim 7, wherein the at least one window is displayed on the at least one further screen by dragging the window into the at least one sequence frame of the software application.

12. The method according to claim 7, wherein the at least one window is displayed on the at least one further screen by means of selection provided in the source frame of the software application.

13. The method according to claim 7, wherein the last window displayed on the at least one further screen is activated.

14. The method according to claim 7, wherein control elements of an active window are displayed in the at least one sequence frame.

15. A computer system which tangibly stores an operating system for operation in the computer system to open or process several documents or files of at least one software application, comprising:
    a mechanism for displaying a source frame of the at least one software application on a screen, wherein in the source frame an opened document or an opened file are displayed at the same time in a window in each instance;
    a mechanism for selecting at least one further screen;
    a mechanism for providing at least one sequence frame of the at least one software application on the at least one further screen; and
    a mechanism for displaying at least one window displaying an opened document, or file, on the at least one provided sequence frame of the software application, wherein the operating system is configured to enable a positioning or resizing of the sequence frame independent of the source frame.

\* \* \* \* \*

UNITED STATES PATENT AND TRADEMARK OFFICE
CERTIFICATE OF CORRECTION

| | | |
|---|---|---|
| PATENT NO. | : 8,086,967 B2 | Page 1 of 1 |
| APPLICATION NO. | : 11/136629 | |
| DATED | : December 27, 2011 | |
| INVENTOR(S) | : Helmut Windl | |

It is certified that error appears in the above-identified patent and that said Letters Patent is hereby corrected as shown below:

On the title page, item (75) Inventor, line 1,
remove [Helmut Windl, Peisig (DE)] and
insert --Helmut Windl, Peising (DE)--.

Signed and Sealed this
Twenty-ninth Day of January, 2013

David J. Kappos
*Director of the United States Patent and Trademark Office*